(12) United States Patent
Hayashi (10) Patent No.: US 7,821,543 B2
(45) Date of Patent: Oct. 26, 2010

(54) ELECTRONIC CAMERA HAVING CONTINUOUS SHOOTING FUNCTION

(75) Inventor: Masaki Hayashi, Kawasaki (JP)

(73) Assignee: Nikon Corporation, Tokyo (JP)

( * ) Notice: Subject to any disclaimer, the term of this patent is extended or adjusted under 35 U.S.C. 154(b) by 309 days.

(21) Appl. No.: 11/882,200

(22) Filed: Jul. 31, 2007

(65) Prior Publication Data

US 2007/0273771 A1   Nov. 29, 2007

Related U.S. Application Data

(63) Continuation of application No. 10/949,311, filed on Sep. 27, 2004, now abandoned, which is a continuation of application No. 09/247,525, filed on Feb. 10, 1999, now abandoned.

(30) Foreign Application Priority Data

Mar. 12, 1998 (JP) ................................. 10-061013

(51) Int. Cl.
  H04N 5/225  (2006.01)
  H04N 5/228  (2006.01)
  H04N 7/14   (2006.01)
  G06K 9/36   (2006.01)

(52) U.S. Cl. .............. 348/220.1; 348/222.1; 348/14.12; 382/232

(58) Field of Classification Search ............. 348/220.1, 348/222.1, 231.6, 14.12; 382/232
See application file for complete search history.

(56) References Cited

U.S. PATENT DOCUMENTS

| 5,018,017 | A | 5/1991 | Sasaki et al. |
| 5,493,335 | A | 2/1996 | Parulski et al. |
| 6,018,362 | A | 1/2000 | Suzuki et al. |
| 6,407,772 | B2 | 6/2002 | Mizoguchi |
| 6,654,498 | B2 * | 11/2003 | Takahashi et al. ........... 382/232 |

FOREIGN PATENT DOCUMENTS

| JP | A-5-191700 | 7/1993 |
| JP | A-6-54252  | 2/1994 |
| JP | A-7-135589 | 5/1995 |

* cited by examiner

*Primary Examiner*—Nhan T Tran
(74) *Attorney, Agent, or Firm*—Oliff & Berridge, PLC (57) ABSTRACT

An electronic camera having a continuous shooting function includes a resolution conversion unit capable of performing resolution conversion at least at a high resolution and at a low resolution that is lower than the high resolution, an image compression unit capable of performing image compression at least at a low compression factor and at a high compression factor that is higher than the low compression factor, and when a continuous shooting unit executes continuous shooting, the image compression unit performs image compression at a high compression factor if the resolution at the resolution conversion unit is set to a low resolution.

6 Claims, 6 Drawing Sheets

ELECTRONIC CAMERA HAVING CONTINUOUS SHOOTING FUNCTION

This is a Continuation of application Ser. No. 10/949,311 filed Sep. 27, 2004, which, in turn, is a continuation of 09/247,525, filed Feb. 10, 1999 which claims the benefit of JP 10-61013 filed Mar. 12, 1998 in Japan. The entire disclosure of the prior applications is hereby incorporated by reference herein in its entirety.

INCORPORATION BY REFERENCE

The disclosure of the following priority application is herein incorporated by reference:

Japanese Patent Application No. 10-61013, filed Mar. 12, 1998

BACKGROUND OF THE INVENTION

1. Field of the Invention

The present invention relates to an electronic camera having a continuous shooting function. More specifically, the present invention relates to an electronic camera capable of achieving higher speed in continuous shooting.

2. Description of the Related Art

The technologies for achieving a higher speed in continuous shooting in electronic cameras in the known art include the following. Japanese Laid-Open Patent Publication No. H6-54252 discloses a technology whereby the continuous shooting speed is increased by simultaneously performing exposure of the subsequent frame on the image capturing element side while compressing the image in the preceding frame.

Japanese Laid-Open Patent Publication No. H5-191700 discloses a technology whereby the length of the image read time is reduced by reading out an image signal every few lines from the image capturing element to achieve higher speed in continuous shooting. Japanese Laid-Open Patent Publication No. H7-135589 discloses a technology whereby the length of the image recording time is reduced by dividing the data of an image that has been captured to be recorded onto a plurality of recording media to achieve a higher speed in continuous shooting.

The following problems arise with the prior art technologies described above.

In regard to the technology disclosed in Japanese Laid-Open Patent Publication No. H6-54252, if the exposure time is longer than the length of time required for compression processing, the exposure operation and the compression processing operation are executed continuously with a high degree of efficiency. As a result, the full advantage can be achieved. However, if the exposure time is shorter than the compression processing time, the image capturing element side must remain in a standby state for the read of the image in the succeeding frame until the compression processing of the preceding frame is completed. Thus, the continuous shooting speed is reduced by the length of time corresponding to the wait time.

The technology disclosed in Japanese Laid-Open Patent Publication No. H5-191700 requires the use of a special image capturing element that is capable of reading out the horizontal lines by specifying individual lines and thus presents a problem in that a general-purpose image capturing element cannot be utilized.

The technology disclosed in Japanese Laid-Open Patent Publication No. H7-135589, which requires a mechanism for mounting a plurality of recording media and recording circuits, makes it difficult to achieve miniaturization of the electronic camera and a reduction in the cost.

SUMMARY OF THE INVENTION

An object of the present invention is to provide an electronic camera capable of achieving higher speed in continuous shooting, which is achieved through a different approach from those taken in the prior art technologies described above.

In order to attain the above object, an electronic camera having a continuous shooting function according to the present invention, comprises: an image capturing unit that captures a subject image; a setting unit that sets operating parameters related to image processing performed during image capturing; a resolution conversion unit that performs resolution conversion on image data of an image captured by the image capturing unit in correspondence to a resolution set at the setting unit; an image compression unit that performs image compression on image data converted by the resolution conversion unit in correspondence to a compression factor set at the setting unit; and a continuous shooting unit that performs continuous shooting of a subject image by continuously driving the image capturing unit, the resolution conversion unit and the image compression unit. And: the resolution conversion unit is capable of performing resolution conversion at least at a high resolution and at a low resolution that is lower than the high resolution; the image compression unit is capable of performing image compression at least at a low compression factor and at a high compression factor that is higher than the low compression factor; and when the continuous shooting unit executes continuous shooting, the image compression unit performs image compression at the high compression factor if the resolution at the resolution conversion unit is set to the low resolution.

Another electronic camera having a continuous shooting function, comprises: an image capturing unit that captures a subject image; a setting unit that sets operating parameters related to image processing performed during image capturing; a resolution conversion unit that performs resolution conversion on image data of an image captured by the image capturing unit in correspondence to a resolution set at the setting unit; an image compression unit that performs image compression on image data converted by the resolution conversion unit in correspondence to a compression factor set at the setting unit; and a continuous shooting unit that performs continuous shooting of a subject image by continuously driving the image capturing unit, the resolution conversion unit and the image compression unit. And: the resolution conversion unit is capable of performing resolution conversion at least at a high resolution and at a low resolution that is lower than the high resolution; the image compression unit is capable of performing image compression at least at a low compression factor and at a high compression factor that is higher than the low compression factor; and when the continuous shooting unit executes continuous shooting, the resolution conversion unit performs resolution conversion at the low resolution if the compression factor at the image compression unit is set to the high compression factor.

Another electronic camera having a continuous shooting function, comprises: an image capturing unit that captures a subject image; a setting unit that sets operating parameters related to image processing performed during image capturing; a resolution conversion unit that performs resolution conversion on image data of an image captured by the image capturing unit in correspondence to a resolution set at the setting unit; an image compression unit that performs image compression on image data converted by the resolution conversion unit in correspondence to a compression factor set at the setting unit; and a continuous shooting unit that performs continuous shooting of a subject image by continuously driving the image capturing unit, the resolution conversion unit and the image compression unit. And: the setting unit is capable of setting a continuous shooting speed at the continuous shooting unit at least at a normal speed and at a high speed that is higher than the normal speed; the resolution conversion unit is capable of performing resolution conversion at least at a high resolution and at a low resolution that is lower than the high resolution; the image compression unit is capable of performing image compression at least at a low compression factor and a high compression factor that is higher than the low compression factor; and when the continuous shooting unit executes continuous shooting, the resolution conversion unit performs resolution conversion at the low resolution and the image compression unit performs image compression at the high compression factor if the continuous shooting speed is set to the high speed.

Another electronic camera having a continuous shooting function, comprises: an image capturing unit that captures a subject image; a setting unit that sets operating parameters related to image processing performed during image capturing; a resolution conversion unit that performs resolution conversion on image data of an image captured by the image capturing unit in correspondence to a resolution set at the setting unit; an image compression unit that performs image compression on image data converted by the resolution conversion unit in correspondence to a compression factor set at the setting unit; and a continuous shooting unit that performs continuous shooting of a subject image by continuously driving the image capturing unit, the resolution conversion unit and the image compression unit. And: the resolution conversion unit is capable of performing resolution conversion at least at a high resolution and at a low resolution that is lower than the high resolution; the image compression unit is capable of performing image compression at least at a low compression factor and at a high compression factor that is higher than the low compression factor; and when the continuous shooting unit executes continuous shooting, the resolution conversion unit performs resolution conversion at the low resolution and the image compression unit performs image compression at the high compression factor.

In each of the above electronic cameras having a continuous shooting function, preferably, an instruction unit that issues instructions to ensure that the resolution conversion unit performs resolution conversion at the low resolution and the image compression unit performs image compression at the high compression factor, without having to change settings for the resolution and the compression factor that have been set by the setting unit, is provided; and when the continuous shooting unit executes continuous shooting, the resolution conversion unit performs resolution conversion at the low resolution and the image compression unit performs image compression at the high compression factor in conformance to instructions issued at the instruction unit.

It is to be noted in each of the above electric cameras that descriptions of "high compression factor", "low resolution" and "high speed" do not always mean "the highest compression factor", "the lowest resolution" and "the highest speed", respectively. Among these options, they mean "compression factor at a high compression factor side", "resolution at a low resolution side" and "speed at a high speed side", respectively.

DESCRIPTION OF THE PREFERRED EMBODIMENT

The following is an explanation of an embodiment of the present invention given in reference to the drawings.

Figure 1:
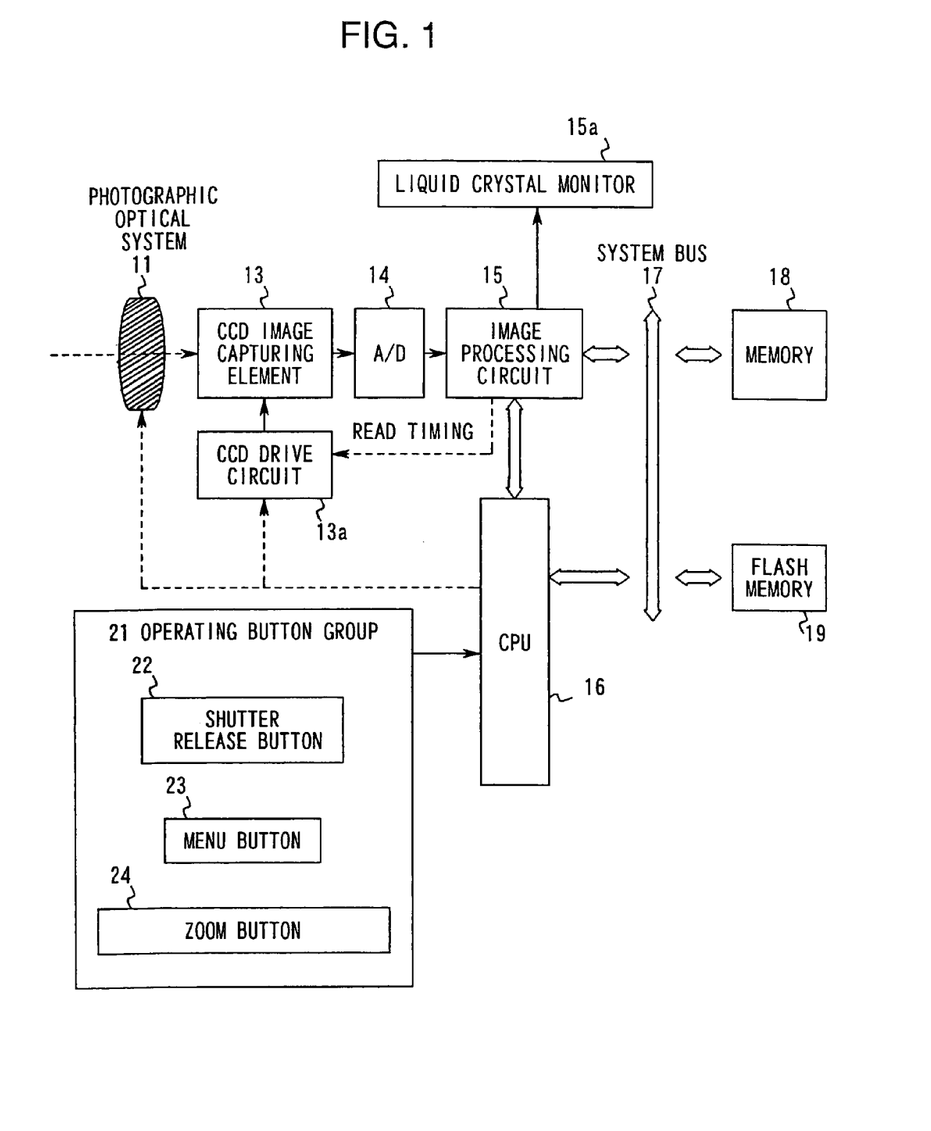
FIG. 1 is a block diagram illustrating the structure of an embodiment.

FIG. 1 is a block diagram illustrating the structure of the electronic camera in this embodiment. In FIG. 1, a photographic optical system 11 is provided inside the main body of the electronic camera. On the side of the photographic optical system 11 where the image space is present, the image capturing surface of a CCD image capturing element 13 is provided. The CCD image capturing element 13 is driven by a control pulse supplied by a CCD drive circuit 13a. An analog image signal from the CCD image capturing element 13 is provided to an image processing circuit 15 as digital image data after going through an A/D conversion circuit 14. The image processing circuit 15 manages the overall image processing achieved by the hardware, including the image compression processing and the image synthesis processing for monitor display.

The image data for monitor display output from the image processing circuit 15 are displayed on a liquid crystal monitor 15a via a liquid crystal drive circuit (not shown). A timing signal for indicating the drive timing of the CCD image capturing element 13 is transmitted from the image processing circuit 15 to the CCD drive circuit 13a. A control signal is provided to the image processing circuit 15 by a CPU 16.

The CPU 16 performs exchange of image data with an image data bus of the image processing circuit 15, a memory 18 and a flash memory card 19, via a system bus 17. An operating button group 21 that includes a shutter release button 22, a menu button 23 and a zoom button 24 is connected to the CPU 16.

In the actual circuit, the CPU 16 described above is constituted as a multi-processor comprising a processor for image processing that manages the overall image processing by software and a processor for system control that monitors the operating buttons and the like at the electronic camera.

In this embodiment, the CCD image capturing element 13 and the CCD drive circuit 13a constitute an image capturing unit, the operating button group 21 and the "function of setting various operating parameters" achieved by the CPU 16 constitute a setting unit, the "function of achieving resolution conversion (or changing) for image data" achieved by the image processing circuit 15 constitutes a resolution conversion unit, the "function of performing image compression of image data" achieved by the image processing circuit 15 constitutes an image compression unit and the "function of executing continuous shooting by controlling the image processing circuit 15 and the CCD drive circuit 13*a*" achieved by the CPU 16 constitutes a continuous shooting unit.

It is to be noted that the function of changing the settings related to image compression or resolution conversion is achieved through the "function of automatically setting the high-speed continuous shooting mode as part of the mode setting operation" of the CPU 16.

(Main Routine in the Embodiment)

The following is an explanation of the operation performed in the embodiment.

Figure 2:
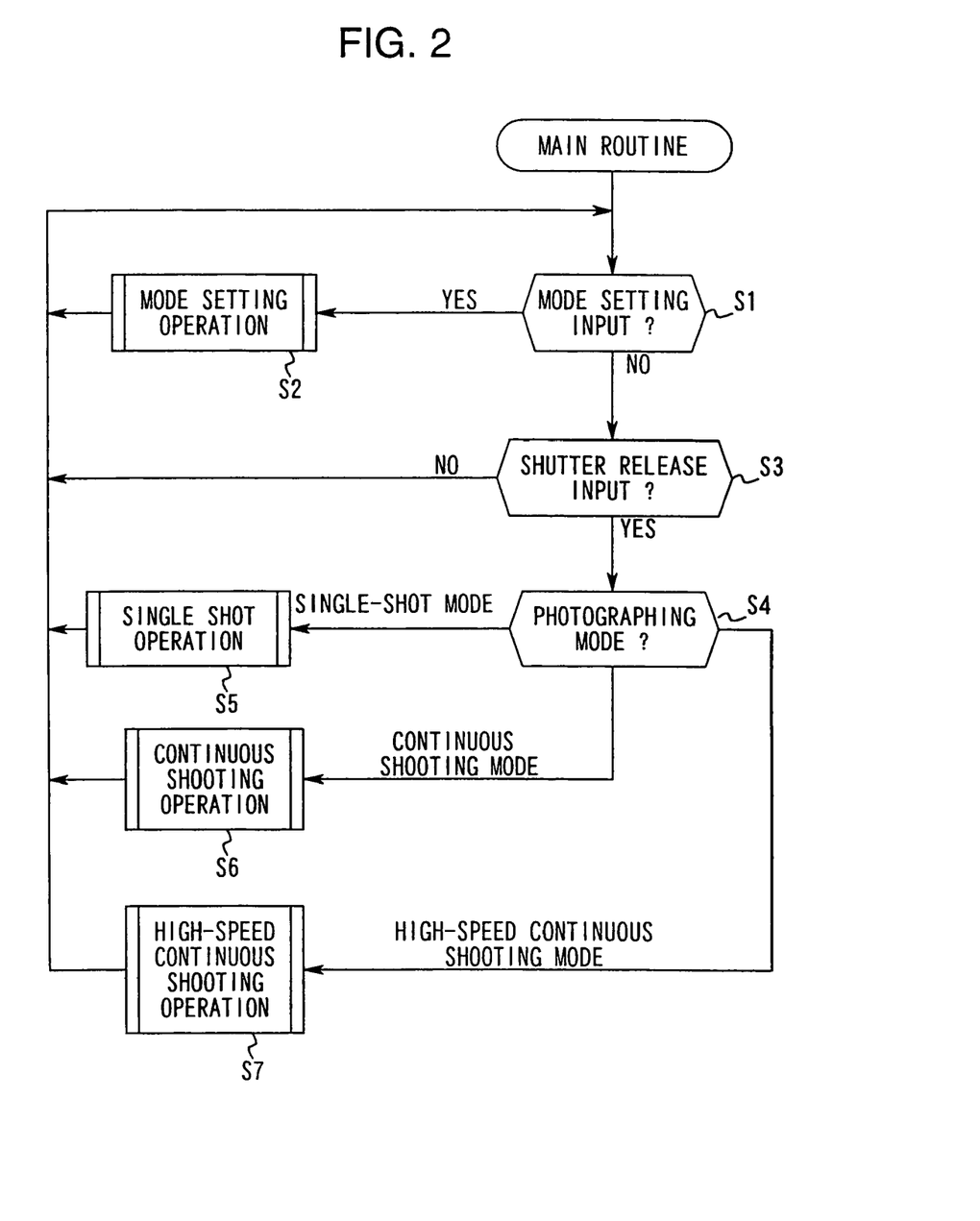
FIG. 2 is a flowchart illustrating the main routine executed during photographing.

FIG. 2 is a flowchart illustrating the main routine executed during photographing in the embodiment. First, the CPU 16 makes a decision as to whether or not an input operation for mode setting has been performed through the operating button group 21 (FIG. 2 S1).

An input operation for mode setting in this context may be, for instance, an operation during which the menu button 23 in the operating button group 21 is pressed down for 0.2 seconds or longer. When such an input operation is performed, the CPU 16 proceeds to execute the mode setting operation shown in FIG. 3 (FIG. 2 S2). If no input operation has been performed, the CPU 16 makes a decision as to whether or not the shutter release button 22 has been pressed (FIG. 2 S3). Until the shutter release button 22 is pressed, the CPU 16 returns to the operation in step S1 to standby for the mode setting operation.

Once the shutter release button 22 is pressed, (FIG. 2 S3 YES), the CPU 16 makes a decision in regard to the setting status for the photographing mode (FIG. 2 S4). If the single-shot mode is set for the photographing mode, the CPU 16 proceeds to execute the single shot operation shown in FIG. 4 (FIG. 2 S5). If the continuous shooting mode has been set, the CPU 16 proceeds to execute the continuous shooting operation in FIG. 5 (FIG. 2 S6).

Figure 6:
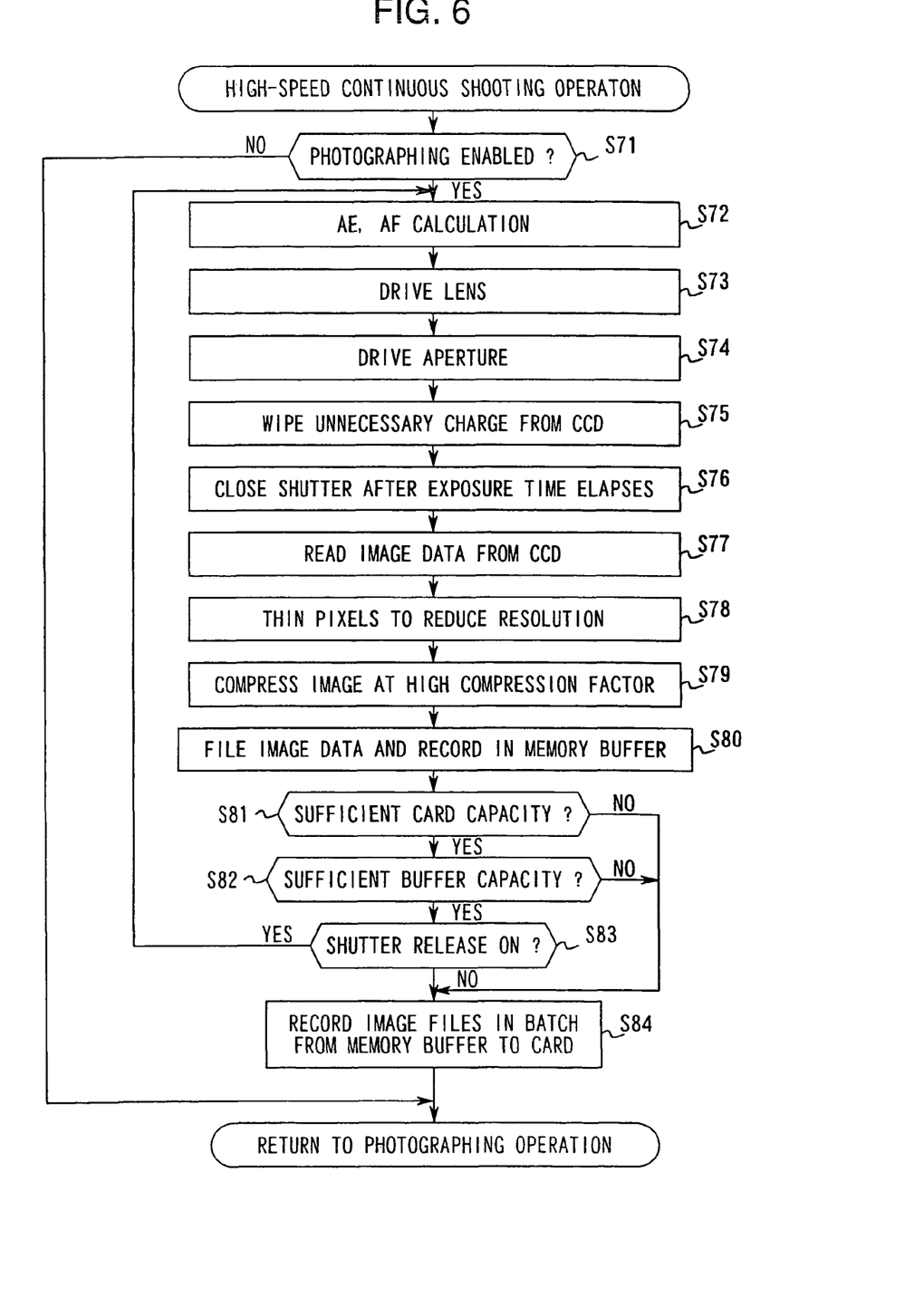
FIG. 6 is a flowchart illustrating the high-speed continuous shooting operation.

If high-speed continuous shooting mode has been set, the CPU 16 proceeds to execute the high-speed continuous shooting operation in FIG. 6 (FIG. 2 S7). When this sequence of operations is completed, the CPU 16 returns to step S1 in preparation for the next mode setting operation and the next operation in which the shutter release button 22 is pressed.

It is to be noted that the "single-shot mode" in this context refers to a normal mode in which one photographic frame is photographed in response to an operation in which the shutter release button 22 is pressed once and that the "continuous shooting mode" refers to a mode in which a plurality of photographic frames are continuously photographed at a constant rate while the shutter release button 22 is held down. The "high-speed continuous shooting mode" is a mode in which continuous shooting is performed at a higher speed compared to that in the "continuous shooting mode."

Next, the operating routines described above are individually explained.

(Mode Setting Operation)

Figure 3:
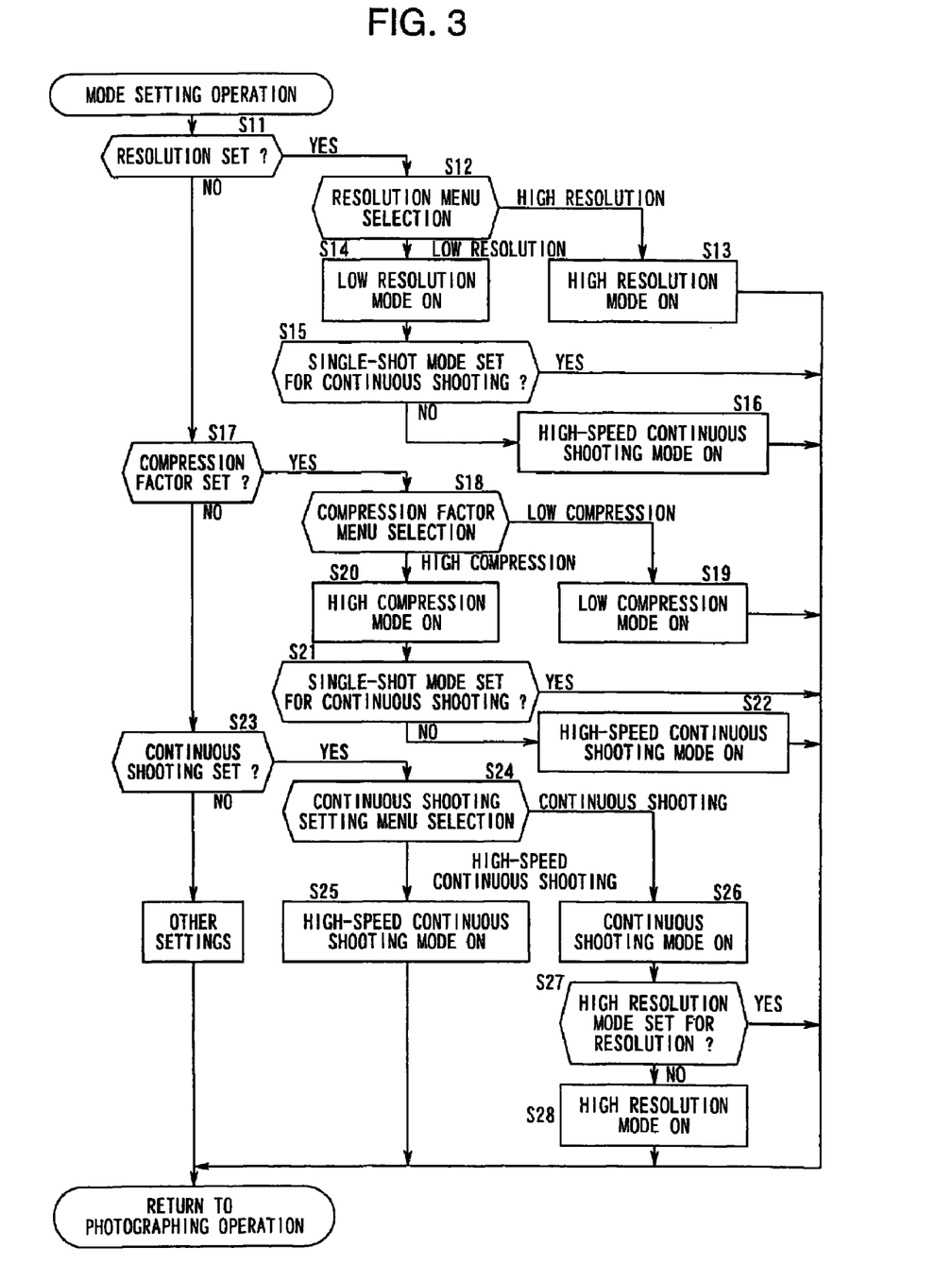
FIG. 3 is a flowchart illustrating the mode setting operation.

FIG. 3 is a flowchart illustrating the mode setting operation. After the mode setting operation starts, the CPU 16 displays a menu list screen on the liquid crystal monitor 15*a* via the image processing circuit 15. The operator operates the zoom button 24 to move the cursor position in the screen and operates the shutter release button 22 to select an appropriate menu item, having positioned the cursor. By repeating this type of interactive operation, a mode setting operation for setting various modes is executed. During the execution of the mode setting operation, the zoom button 24 is used as a cursor positioning button and the shutter release button 22 is used as a selection deciding button, with their original zoom and shutter release functions prohibited.

The following is an explanation of three types of mode setting operations, i.e., "resolution setting", "compression factor setting" and "continuous shooting setting".

(1) Resolution Setting Operation

When the menu item "resolution setting" is selected (FIG. 3 S11 YES), the CPU 16 displays the options, "high resolution mode" and "low resolution mode" in the menu (FIG. 3 S12). At this point, if the "high resolution mode" is selected in the menu, the CPU 16 first sets an internal flag at the image processing circuit 15 to the high resolution mode (FIG. 3 S13) and then returns to the main routine in FIG. 2.

If the "low resolution mode" is selected in the menu, the CPU 16 first sets the internal flag at the image processing circuit 15 to the low resolution mode (FIG. 3 S14). With the low resolution mode set in this manner, the CPU 16 makes a decision as to whether or not the single-shot mode has been set (FIG. 3 S15). If the single-shot mode has been set (FIG. 3 S15 YES), the CPU 16 directly returns to the main routine in FIG. 2. If a mode other than the single-shot mode (the continuous shooting mode or the high-speed continuous shooting mode) has been set (FIG. 3 S15 NO), the CPU 16 first changes the setting of the internal flag at the image processing circuit 15 to high-speed continuous shooting mode (FIG. 3 S16) and then returns to the main routine in FIG. 2. Through the operation described above, the setting for the resolution mode is completed.

It is to be noted that the "high resolution mode" in this context refers to a mode in which the data of an image that has been captured by the CCD image capturing element 13 are used with the number of pixels unchanged without thinning the pixels. The "low resolution mode" refers to a mode in which the pixels in the data of an image captured by the CCD image capturing element 13 are thinned at a specific rate to use image data having a reduced number of pixels.

(2) Compression Factor Setting Operation

When the menu item "compression factor setting" is selected (FIG. 3 S17 YES), the CPU 16 displays the options, "low compression mode" and "high compression mode" in the menu (FIG. 3 S18). If the "low compression mode" is selected in the menu, the CPU 16 first sets the internal flag at the image processing circuit 15 to the low compression mode (FIG. 3 S19), and then returns to the main routine in FIG. 2. It is to be noted that the low compression mode in this context refers to a mode in which an appropriate low compression factor is set to assure the quality of the image.

If the "high compression mode" is selected in the menu, the CPU 16 sets the internal flag at the image processing circuit 15 to the high compression mode (FIG. 3 S20). It is to be noted that the high compression mode in this context refers to a mode in which an appropriate high compression factor is set, mainly for the purpose of reducing the length of the image transfer time.

As the high compression mode is set in this manner, the CPU 16 makes a decision as to whether or not the single-shot mode has been set (FIG. 3 S21). If the single-shot mode has been set (FIG. 3 S21 YES) the CPU 16 directly returns to the main routine in FIG. 2. If, on the other hand, a mode other than the single-shot mode (the continuous shooting mode or the high speed continuous shooting mode) has been set (FIG. 3 S21 NO), the CPU 16 first changes the setting of the internal flag at the image processing circuit 15 to the high-speed continuous shooting mode (FIG. 3 S22) and then returns to the main routine in FIG. 2. Through the operation described above, the setting of the compression mode is completed.

(3) Continuous Shooting Setting Operation

When the menu item "continuous shooting setting" is selected (FIG. 3 S23 YES), the CPU 16 displays options, the "high-speed continuous shooting mode" and the "continuous shooting mode" in the menu (FIG. 3 S24). If the "high-speed continuous shooting mode" is selected in the menu, the CPU 16 first sets the internal flag at the image processing circuit 15 to the high-speed continuous shooting mode (FIG. 3 S25) and returns to the main routine in FIG. 2.

If the "continuous shooting mode" is selected in the menu, the CPU 16 sets the internal flag at the image processing circuit 15 to the continuous shooting mode (FIG. 3 S26). As the continuous shooting mode is set in this manner, the CPU 16 first changes the setting of the internal flag at the image processing circuit 15 to the high resolution mode (FIG. 3 S27, S28) and then returns to the main routine in FIG. 2. Through the operation described above, the setting of the continuous shooting mode is completed.

(Single Shot Operation)

Figure 4:
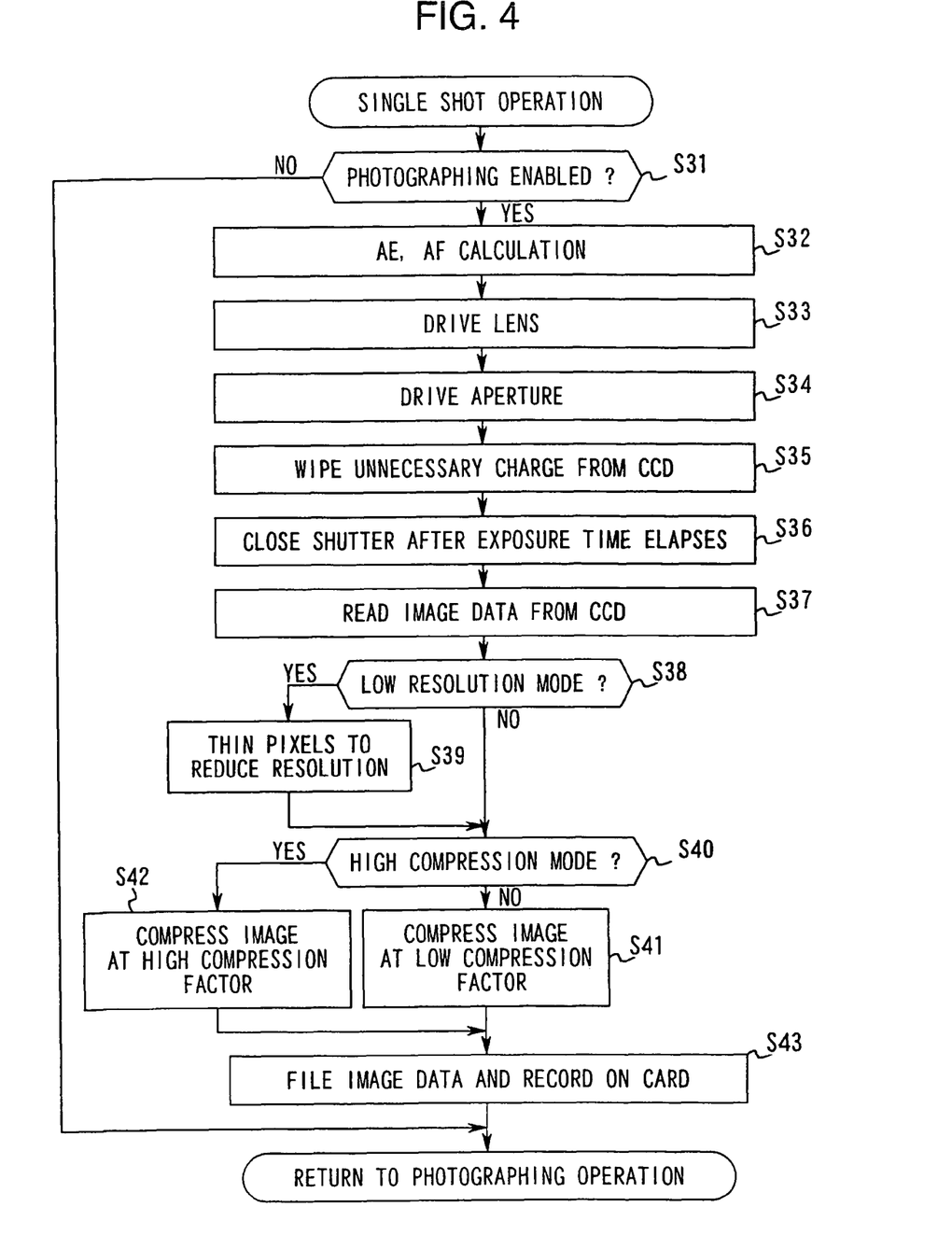
FIG. 4 is a flowchart illustrating the single-shot operation.

FIG. 4 is a flowchart illustrating the single shot operation.

After the single shot operation starts, the CPU 16 makes a decision as to whether or not photographing is enabled by verifying the battery state, the quantity of electrical charge at the strobe, the remaining capacity in the flash memory card 19 and the like (FIG. 4 S31).

If a decision is made that photographing is disabled (FIG. 4 S31 NO), the CPU 16 displays a warning to that effect on the liquid crystal monitor 15a and then returns to the main routine in FIG. 2. If it is decided that photographing is enabled (FIG. 4 S31 YES), the CPU 16 takes in image data from the CCD image capturing element 13 and calculates the correct aperture value, the correct exposure time and the quantity of contrast (FIG. 4 S32).

Based upon the contrast quantity thus calculated, the CPU 16 moves the photographic optical system 11 backward and forward to execute the scanning and contrast detecting type AF control (FIG. 4 S33). When the AF control is completed, the CPU 16 adjusts the aperture diameter of the photographic optical system 11 (also used as the lens shutter) in correspondence to the correct aperture value (FIG. 4 S34). Following these preparations, the CPU 16 wipes or discharges all unnecessary electrical charge at the CCD image capturing element 13 via the CCD drive circuit 13a, to start photoelectric storage of a new image of the subject (FIG. 4 S35).

When the correct exposure time has elapsed in this state, the CPU 16 closes the lens shutter of the photographic optical system 11 to end the photoelectric storage of the subject image (FIG. 4 S36).

In the following step, the CPU 16 reads out the image data from the CCD image capturing element 13 via the CCD drive circuit 13a (FIG. 4 S37). The image data thus read out are first digitized via the A/D conversion circuit 14 and are then taken into the image processing circuit 15. The image processing circuit 15 temporarily stores the image data in the memory 18.

If the high resolution mode has been set in advance (FIG. 4 S38 NO), the image processing circuit 15 does not execute resolution conversion (or changing) since the data of the captured image are used with the number of the pixels unchanged, without thinning any pixels. If, on the other hand, the low resolution mode has been set in advance (FIG. 4 S38 YES), the image processing circuit 15 thins out some pixels from the image data in the memory 18 to reduce the resolution (FIG. 4 S39).

Next, the image processing circuit 15 undertakes processing such as DCT (discrete cosine transfer), quantization and variable length encoding before it executes image compression for the image data. If the low compression mode has been set in advance (FIG. 4 S40 NO), the image processing circuit 15 performs image compression for the image data by using a quantizing table for a low compression factor (FIG. 4 S41). If, on the other hand, the high compression mode has been set in advance (FIG. 4 S40 YES), the image processing circuit 15 performs image compression for the image data by using a quantizing table for a high compression factor (FIG. 4 S42).

After filing the image data that have been compressed in this manner, the CPU 16 stores the filed image data in the flash memory card 19 (FIG. 4 S43). Through the sequence of operations described above, the single shot operation is completed.

(Continuous Shooting Operation)

Figure 5:
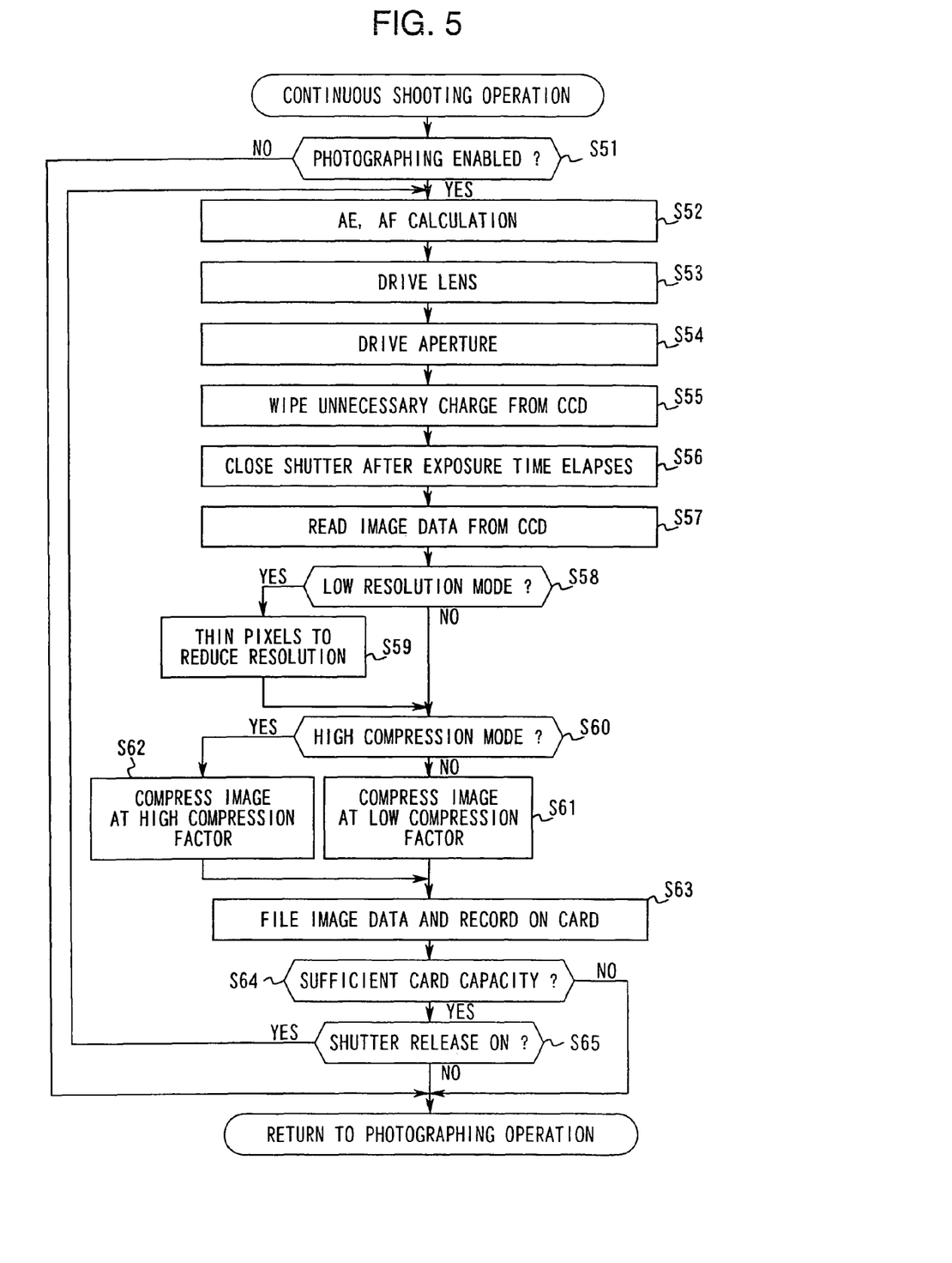
FIG. 5 is a flowchart illustrating the continuous shooting operation.

FIG. 5 is a flowchart illustrating the continuous shooting operation. It is to be noted that the operation performed at S51~S63 in FIG. 5 are identical to that in the single shot operation explained earlier (FIG. 4 S31~S43). In this embodiment, the continuous shooting operation is executed by repeating an operation (FIG. 5 S52~S63) identical to that in the single shot operation. The CPU 16 ends the continuous shooting operation as soon as the pressure on the shutter release button 22 is released (FIG. 5 S65) to return to the main routine in FIG. 2.

If the remaining capacity at the flash memory card 19 becomes insufficient during such a continuous shooting operation (FIG. 5 S64), the CPU 16 immediately interrupts the continuous shooting operation to return to the main routine in FIG. 2.

(High-Speed Continuous Shooting Operation)

FIG. 6 is a flowchart illustrating the high-speed continuous shooting operation. When the high-speed continuous shooting operation starts, the CPU 16 makes a decision as to whether or not photographing is enabled by checking the battery state, the quantity of the electrical charge at the strobe, the remaining capacity at the flash memory card 19 and the like (FIG. 6 S71).

If a decision is made that photographing is disabled (FIG. 6 S71 NO), the CPU 16 displays a warning to that effect on the liquid crystal monitor 15a and then returns to the main routine in FIG. 2. If it is decided that photographing is enabled (FIG. 6 S71 YES), the CPU 16 calculates the correct aperture value, the correct exposure time and the quantity of contrast based upon image data obtained from the CCD image capturing element 13 (FIG. 6 S72).

Based upon the contrast quantity thus calculated, the CPU 16 moves the photographic optical system 11 backward and forward to execute the scanning and contrast detecting type AF control (FIG. 6 S73). When the AF control is completed, the CPU 16 adjusts the aperture diameter of the photographic optical system 11 (also used as the lens shutter) in correspondence to the correct aperture value (FIG. 6 S74). Following these preparations, the CPU 16 wipes or discharges all the unnecessary electrical charge at the CCD image capturing element 13 via the CCD drive circuit 13a, to start a new photoelectric storage of the image of the subject (FIG. 6 S75).

When the correct length of exposure time has elapsed in this state, the CPU 16 closes the lens shutter at the photographic optical system 11 and ends the photoelectric storage of the subject image (FIG. 6 S76). The CPU 16 reads out the image data from the CCD image capturing element 13 via the CCD drive circuit 13a (FIG. 6 S77). The image data thus read out are first digitized via the A/D conversion circuit 14 and are then taken into the image processing circuit 15. The image processing circuit 15 temporarily stores the image data in the memory 18.

The image processing circuit 15 reduces the resolution of the image data in the memory 18 regardless of the resolution mode that has been set in advance (FIG. 6 S78). Next, the image processing circuit 15 performs image compression for the image data in the memory 18 at the high compression factor regardless of the compression mode that has been set in advance (FIG. 6 S79).

After filing the image data that have been compressed in this manner, the CPU 16 temporarily stores the filed image data in a buffer area provided in the memory 18.

By repeating this sequence of operations (FIG. 6 S72~S80), the high-speed continuous shooting operation is executed. If the pressure on the shutter release button 22 is released during such a high-speed continuous shooting operation (FIG. 6 S83), the CPU 16 first transfers the image files in the buffer area to the flash memory card 19 in a batch for recording (FIG. 6 S84) and then returns to the main routine in FIG. 2.

In addition, if the remaining capacity at the flash memory card 19 is anticipated to become insufficient (FIG. 6 S81) or if the buffer capacity of the memory 18 becomes insufficient (FIG. 6 S82) during the high-speed continuous shooting operation, the CPU 16 immediately transfers the image files in the buffer area to the flash memory card 19 in a batch for recording (FIG. 6 S84) and then returns to the main routine in FIG. 2. Through the sequence of operations described above, the high-speed continuous shooting operation is completed.

With the operation in the embodiment achieved as described above, if the operator performs a setting operation to set the low resolution mode while the continuous shooting mode is set, the mode is reset to the high-speed continuous shooting mode automatically (see FIG. 3 S15, S16). In the high-speed continuous shooting mode, image compression is performed at the high compression factor regardless of the compression mode setting (see FIG. 6 S79). Thus, the quantity of data after DCT quantization during the image compression processing is reduced so that the length of time required for variable length encoding and the like can be reduced. In addition, since the image data quantity after the compression is bound to be small, the length of time required for image recording in the memory 18 can be reduced. For these reasons, the length of time required for photographing one frame is reduced, thereby making it possible to achieve a higher speed in continuous shooting with an even higher degree of reliability.

If, on the other hand, the operator performs an operation to set the high resolution mode while the continuous shooting mode is set, the mode is not necessarily reset to the high-speed continuous shooting mode (see FIG. 3 S13). In this case, since the resolution conversion and the image compression are executed in conformance to the mode setting, it is also possible to execute continuous shooting of high quality images at high resolution with a low compression factor.

In this embodiment, if the operator performs an operation to set the high compression mode while the continuous shooting mode is set, the mode is automatically reset to the high-speed continuous shooting mode (see FIG. 3 S21, S22). In the high-speed continuous shooting mode, the image data are converted with low resolution regardless of the setting for the resolution mode (see FIG. 6 S78). Thus, the amount of arithmetic processing to be performed for the image compression is reduced to achieve a reduction in the length of compression processing time. Furthermore, with the quantity of image data reduced after the compression, the length of time required for image recording, too, is reduced. For these reasons, the length of time required for photographing a given frame is reduced so that a higher speed in continuous shooting is achieved with an even higher degree of reliability.

If the operator performs an operation for setting the low compression mode while the continuous shooting mode is set, the mode is not necessarily reset to the high-speed continuous shooting mode (see FIG. 3 S19). In this case, since the resolution conversion and the image compression are executed in conformance to the mode settings, it is also possible to execute continuous shooting of images of high quality at the high resolution and the low compression factors.

In the embodiment, the operator may directly select the high-speed continuous shooting mode (FIG. 3 S25). In this high-speed continuous shooting mode, the image data are converted with a low resolution and a high compression factor regardless of the settings for the resolution mode and the compression mode (see FIG. 6 S78, S79). Thus, a higher speed in continuous shooting is achieved with a higher degree of reliability by reducing the length of time required for compression processing and the length of time required for image recording.

In addition, the operator may directly select the continuous shooting mode. Since the resolution conversion and the image compression are executed in conformance to the mode settings in this case, it is also possible to execute continuous shooting of high quality images at the high resolution and at the low compression factors.

In the embodiments, when setting the high-speed continuous shooting mode, the settings for the compression mode and the resolution mode at that point, are maintained unchanged. Consequently, when the high-speed continuous shooting mode is cleared, the operation can directly return to the original compression mode and resolution mode. This operation eliminates the necessity for resetting the compression mode and the resolution mode when the high-speed continuous shooting mode is cleared, to further improve the operability of the electronic camera.

It is to be noted that while the high-speed continuous shooting mode is automatically set during a mode setting operation, the present invention is not limited to this example. For instance, the image processing circuit 15 may forcibly execute image processing in the low resolution mode (or the high compression mode) if the high compression mode (or the low resolution mode) is set in the continuous shooting processing routine. Through such an operation, too, a higher speed in continuous shooting can be realized with a high degree of reliability.

In addition, in the embodiment described above, continuous shooting is possible in two different modes, i.e., the continuous shooting mode and the high-speed continuous shooting mode. The embodiment assumes a structure in which, if the high compression mode or the low resolution mode is set while the "continuous shooting mode" is set, the mode is automatically switched to the "high-speed continuous shooting mode". However, the present invention is not limited to this structural example. For instance, there may be only one mode for continuous shooting to perform high-speed continuous shooting when the high compression mode or the low resolution mode is set and to perform low-speed continuous shooting in other cases. Namely, the photographer may have a choice only as to whether or not continuous shooting is to be performed, with high-speed continuous shooting automatically performed if the high compression mode or the low resolution mode is set and low-speed continuous shooting performed under other conditions. In this case, only the processing in which the internal flag is set to the "continuous shooting mode" in step S26 among steps S24~S28 in FIG. 3 needs to be performed without having to select a menu item for continuous shooting setting.

Furthermore, if there is only one mode available for the continuous shooting, high-speed continuous shooting may be unconditionally performed if the "continuous shooting mode" is selected. In this case, only the processing for setting the internal flag to the "high-speed continuous shooting mode" in step S25 needs to be performed among steps S24~S28 in FIG. 3.

Moreover, while continuous shooting is started up by pressing down the shutter release button 22 while the "continuous shooting mode" or the "high-speed continuous shooting mode" is set in the embodiment described above, the startup operation for continuous shooting in the present invention is not limited to this example. For instance, continuous shooting may be started up and continued in response to a sustained pressure on the shutter release button 22.

What is claimed is:

1. An electronic camera having a continuous shooting function, comprising:
    an image capturing unit that captures a subject image;
    a setting unit that sets operating parameters related to image processing performed during image capturing;
    a resolution conversion unit that performs resolution conversion on image data of an image captured by said image capturing unit in correspondence to a resolution set by said setting unit;
    an image compression unit that performs image compression on image data converted by said resolution conversion unit in correspondence to a compression factor set by said setting unit; and
    a continuous shooting unit that performs continuous shooting by continuously driving said image capturing unit, said resolution conversion unit and said image compression unit to obtain a plurality of subject images, wherein:
    said resolution conversion unit is capable of performing resolution conversion at least at a high resolution and at a low resolution that is lower than the high resolution;
    said image compression unit is capable of performing image compression at least at a low compression factor and at a high compression factor that is higher than the low compression factor;
    said continuous shooting unit is capable of performing continuous shooting at least at a continuous shooting mode and at a high-speed continuous shooting mode that is higher than the continuous shooting mode;
    said setting unit is capable of setting the resolution at said resolution conversion unit to the high resolution or the low resolution; and
    when said continuous shooting unit performs the continuous shooting mode, if the resolution of said resolution conversion unit is set at the low resolution by said setting unit, said continuous shooting unit switches from the continuous shooting mode to the high-speed continuous shooting mode, and said image compression unit performs image compression at the high compression factor.

2. An electronic camera having a continuous shooting function according to claim 1, further comprising:
    an instruction unit that issues instructions to ensure that said resolution conversion unit performs resolution conversion at the low resolution and said image compression unit performs image compression at the high compression factor, without having to change settings for the resolution and the compression factor that have been set by said setting unit,
    wherein, when said continuous shooting unit executes continuous shooting, said resolution conversion unit performs resolution conversion at the low resolution and said image compression unit performs image compression at the high compression factor in conformance to instructions issued at said instruction unit.

3. An electronic camera having a continuous shooting function according to claim 1, wherein:
    said setting unit is capable of setting the resolution at said resolution conversion unit to the high resolution or the low resolution through an operation by an operator.

4. An electronic camera having a continuous shooting function, comprising:
    an image capturing unit that captures a subject image;
    a setting unit that sets operating parameters related to image processing performed during image capturing;
    a resolution conversion unit that performs resolution conversion on image data of an image captured by said image capturing unit in correspondence to a resolution set by said setting unit;
    an image compression unit that performs image compression on image data converted by said resolution conversion unit in correspondence to a compression factor set by said setting unit; and
    a continuous shooting unit that performs continuous shooting by continuously driving said image capturing unit, said resolution conversion unit and said image compression unit to obtain a plurality of subject images, wherein:
    said resolution conversion unit is capable of performing resolution conversion at least at a high resolution and at a low resolution that is lower than the high resolution;
    said image compression unit is capable of performing image compression at least at a low compression factor and at a high compression factor that is higher than the low compression factor;
    said continuous shooting unit is capable of performing continuous shooting at least at a continuous shooting mode and at a high-speed continuous shooting mode that is higher than the continuous shooting mode;
    said setting unit is capable of setting the compression factor at said image compression unit to the high compression factor or the low compression factor; and
    when said continuous shooting unit performs the continuous shooting mode, if the compression factor of said image compression unit is set at the high compression factor, said continuous shooting unit switches from the continuous shooting mode to the high-speed continuous shooting mode, and said resolution conversion unit performs a resolution conversion at the low resolution.

5. An electronic camera having a continuous shooting function according to claim 4, further comprising:
    an instruction unit that issues instructions to ensure that said resolution conversion unit performs resolution conversion at the low resolution and said image compression unit performs image compression at the high compression factor, without having to change settings for the resolution and the compression factor that have been set by said setting unit,
    wherein, when said continuous shooting unit executes continuous shooting, said resolution conversion unit performs resolution conversion at the low resolution and said image compression unit performs image compression at the high compression factor in conformance to instructions issued at said instruction unit.

6. An electronic camera having a continuous shooting function according to claim 4, wherein:
    said setting unit is capable of setting the compression factor at said image compression unit to the high compression factor or the low compression factor through an operation by an operator.

* * * * *